(12) United States Patent
Lee et al.

(10) Patent No.: US 12,488,779 B2
(45) Date of Patent: Dec. 2, 2025

(54) METHOD AND APPARATUS FOR VOICE SYNTHESIS BASED ON BRAIN WAVES DURING IMAGINED SPEECH

(71) Applicant: Korea University Research and Business Foundation, Seoul (KR)

(72) Inventors: Seong Whan Lee, Seoul (KR); Young Eun Lee, Seongnam-si (KR); Seo Hyun Lee, Seoul (KR); Soo Won Kim, Daegu (KR); Sang Ho Kim, Seoul (KR); Byung Kwan Ko, Donghae-si (KR); Ji Won Lee, Seoul (KR); Jung Sun Lee, Changwon-si (KR)

(73) Assignee: Korea University Research and Business Foundation, Seoul (KR)

( * ) Notice: Subject to any disclaimer, the term of this patent is extended or adjusted under 35 U.S.C. 154(b) by 301 days.

(21) Appl. No.: 18/199,670

(22) Filed: May 19, 2023

(65) Prior Publication Data

US 2024/0194179 A1    Jun. 13, 2024

(30) Foreign Application Priority Data

Dec. 13, 2022 (KR) .................. 10-2022-0173551

(51) Int. Cl.
*G10L 13/027* (2013.01)
*G06F 3/01* (2006.01)
(Continued)

(52) U.S. Cl.
CPC ............ *G10L 13/027* (2013.01); *G06F 3/015* (2013.01); *G10L 13/047* (2013.01); *G10L 15/26* (2013.01); *G10L 25/18* (2013.01)

(58) Field of Classification Search
None
See application file for complete search history.

(56) References Cited

U.S. PATENT DOCUMENTS 12,051,428 B1 * 7/2024 Petrochuk ............... G10L 25/30
2015/0297106 A1 * 10/2015 Pasley .................... A61B 5/741
600/383

(Continued)

FOREIGN PATENT DOCUMENTS

KR    10-2020-0052807 A    5/2020
KR    10-2022-0004272 A    1/2022

OTHER PUBLICATIONS

Herff, Christian, et al., "Towards direct speech synthesis from ECoG: A pilot study", 38th Annual International Conference of the IEEE Engineering in Medicine and Biology Society (EMBC), 2016, (p. 1540-1543).

(Continued)

*Primary Examiner* — Daniel C Washburn
*Assistant Examiner* — Tyler Becker
(74) *Attorney, Agent, or Firm* — NSIP Law

(57) ABSTRACT

The present invention relates to a method and an apparatus for synthesizing the voice based on brain waves during imagined speech. The method for synthesizing the voice based on brain waves during imagined speech according to an embodiment of the present invention may include the following steps: a step to obtain the user's brain waves during imagined speech; a step to convert the above-mentioned brain waves of imagined speech into embedding vectors; a step to generate the mel-spectrograms based on the above-mentioned embedding vectors; a step to generate the voice using the above-mentioned mel-spectrograms; a step to output the above-mentioned voice.

10 Claims, 5 Drawing Sheets

(51) Int. Cl.
*G10L 13/047* (2013.01)
*G10L 15/26* (2006.01)
*G10L 25/18* (2013.01)

(56)     References Cited

U.S. PATENT DOCUMENTS

2015/0380009 A1\*  12/2015  Chang ................. A61B 5/4076
                                                704/263
2019/0295566 A1\*   9/2019  Moghadamfalahi ... A61B 5/318
2020/0142481 A1\*   5/2020  Lee ......................... G06F 3/015
2021/0050004 A1\*   2/2021  Whiting ................. G10L 15/02
2023/0025518 A1\*   1/2023  Pazderski .............. A61B 5/369

OTHER PUBLICATIONS

Berezutskaya, Julia, et al., "Towards Naturalistic Speech Decoding from Intracranial Brain Data", 44th Annual International Conference of the IEEE Engineering in Medicine & Biology Society (EMBC), 2022, (p. 3100-3104).

\* cited by examiner

[Figure 1]
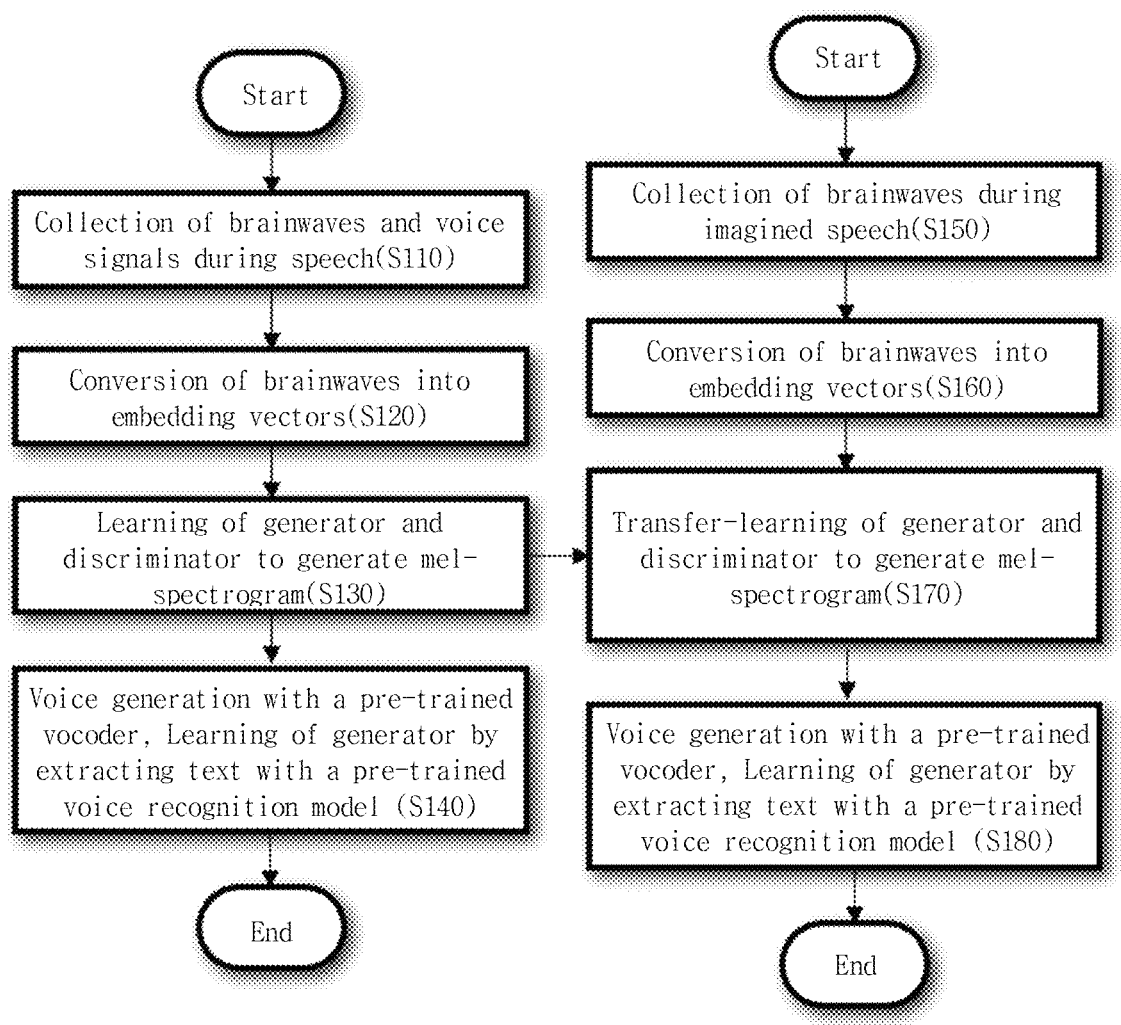

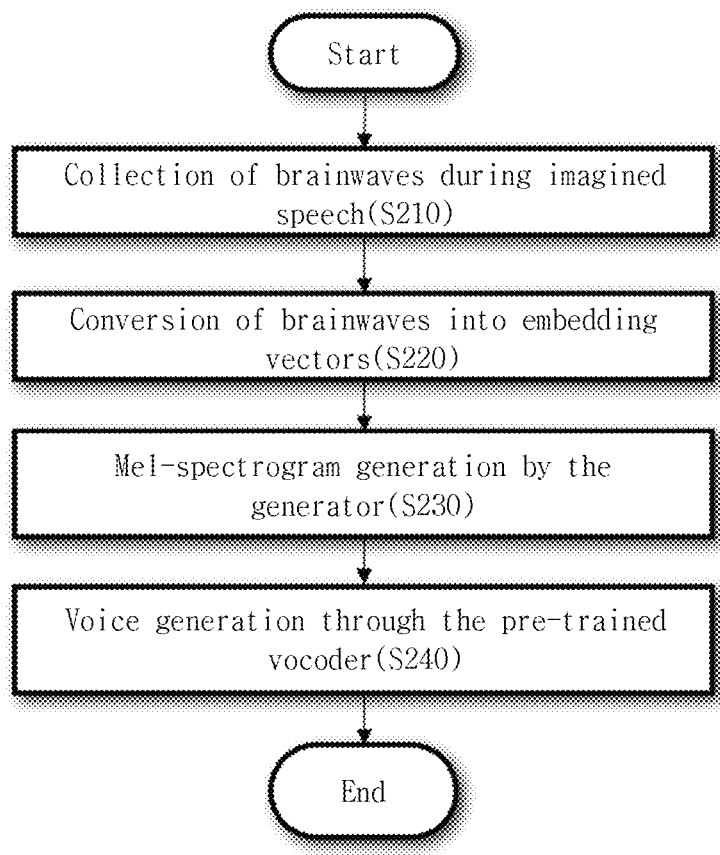

[Figure 3]
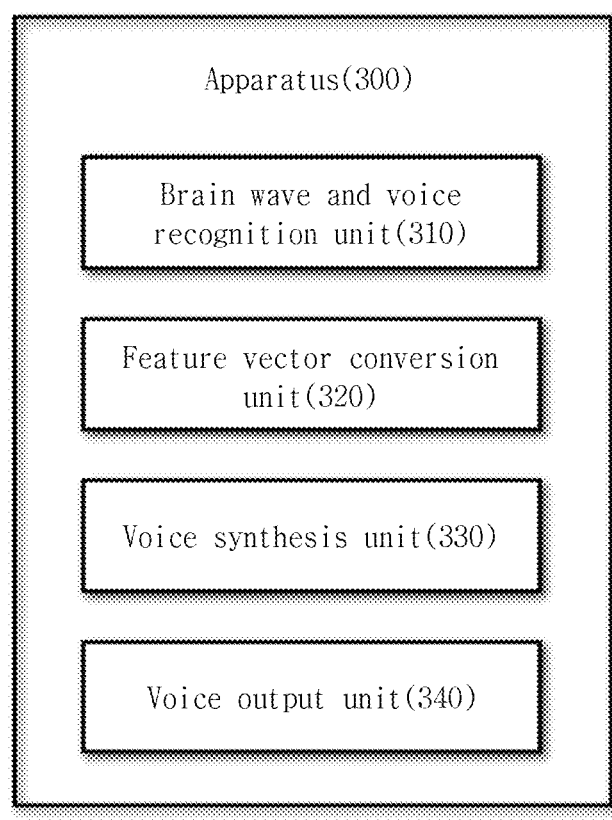

【Figure 4】
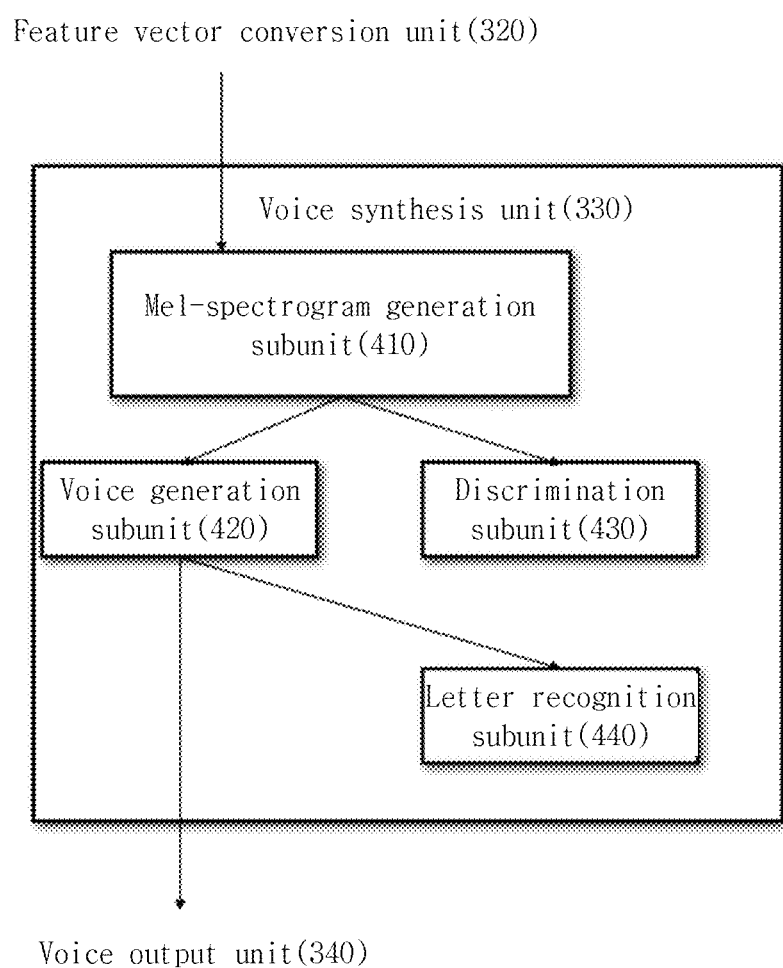

[Figure 5]
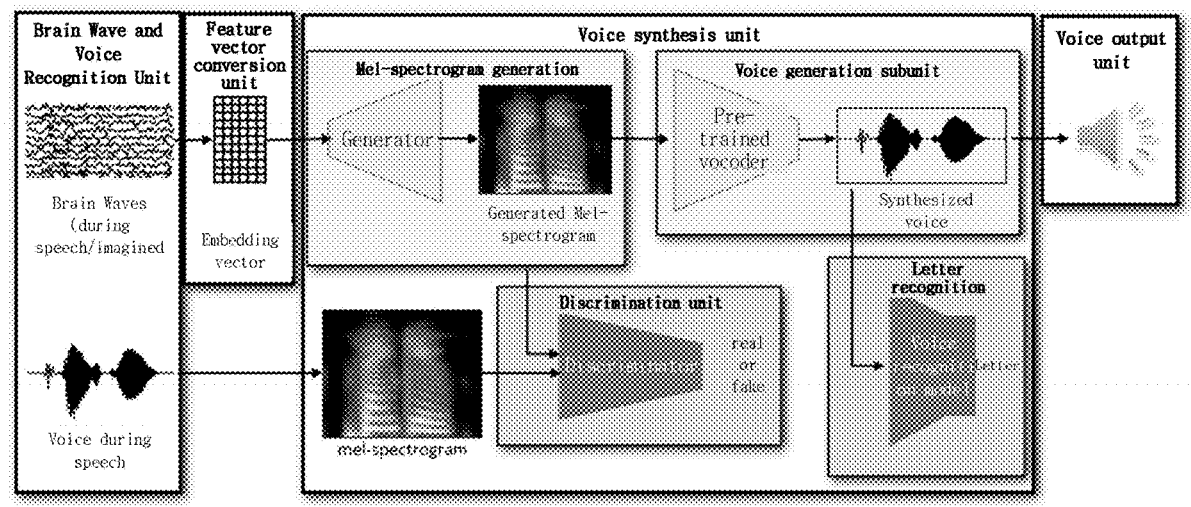

METHOD AND APPARATUS FOR VOICE SYNTHESIS BASED ON BRAIN WAVES DURING IMAGINED SPEECH

CROSS-REFERENCE TO RELATED APPLICATION

This application claims priority under 35 U.S.C. § 119(a) to Korean Patent Application No. 10-2022-0173551 filed on Dec. 13, 2022, in the Korean Intellectual Property Office, the disclosure of which is incorporated herein by reference in its entirety.

TECHNICAL FIELD

This invention relates to a method and apparatus for synthesizing the voice based on brain waves during imagined speech. More specifically, it relates to a method and apparatus for synthesizing a user's speech from the user's brain waves by measuring the user's signals when imagining the speech of words or sentences.

TECHNOLOGICAL BACKGROUND OF INVENTION

Brain-machine interface is a technology that measures the signals generated from nerve cells in the human brain and controls the output devices such as computers only through the brain waves without any other input device. Conventionally, it has been mainly used in the medical fields to control prosthetic devices for patients who can hardly move their limbs or paralyzed ones due to spinal injuries or degenerative neurological diseases, or spellers for their communication. However, with the recent development of brain wave analysis technology, the non-invasive brain-computer interfaces tend to be applied in various fields including daily life assistance services for ordinary persons as well as patients. There are two types of brain-computer interfaces: extrinsic and intrinsic. The extrinsic method is to control the device based on brain waves induced by external stimuli, and the intrinsic one is to control the device by analyzing the brain waves induced by the user's imagination without external stimuli. Since the intrinsic method does not require a separate external stimulation device but is just intuitive as to reflect the user's imaginary intention, it is more used in brain-computer interface technology nowadays.

The brain-machine interface recognizes the user's intention by mainly inducing specific brain wave patterns such as motor imagery (MI), steady state evoked potential (SSEP), event related potential (ERP), and imagined speech. Currently the MI and ERP systems are widely used but they have disadvantages in that the letters to input are so limited and unintuitive.

The imagined speech is a newest paradigm that recognizes the user's intention by inducing the brain waves through the imagination of speaking without actually making a sound or moving the speech organ. During the imagined speech when the user imagines as if he/she is speaking something, a specific pattern of brain waves is expressed in Broca's area, which is responsible for speech, and Wernicke's area, which is responsible for interpreting language. The imagined speech can realize the class classification with a higher degree of freedom due to linguistic diversity, and the intuitive communication by directly imagining speaking in conveying the user's conversational intention. This brain-machine interface based on imagined speech can be used as a communication system for patients with speech disabilities or ordinary people.

Currently, the detection of user intention through the brain waves is mainly focusing on the classification of class units. However, in order to be used as a communication system, it is necessary to utilize a technology with a high degree of freedom. In other words, the communication with a high degree of freedom can be obtained through a technology to synthesize the speech with a high degree of freedom from brain waves, rather than a system to simply classify the classes. The present invention deals with this.

PRECEDENT TECHNOLOGICAL LITERATURE

Patent Literature

Republic of Korea Open Patent Publication No. 10-2020-0052807 (May 15, 2020)

CONTENTS OF INVENTION

Tasks to be Solved

Technologies for recognizing user's intentions from the brain waves have recently been developed, and the deep learning-based methodologies are being developed to improve the classification recognition performance. Among them, the user intention recognition technology based on the imagined speech has an advantage in that it can increase the number of classes. However, the classification-based user intention recognition has a limit in that the degrees of freedom are confined to the number of classified classes. Therefore, the present invention proposes a speech synthesis methodology to synthesize the speech from the brain waves.

The technical tasks of the present invention are not limited to those mentioned above, and other technical tasks not mentioned will be clearly understood by the ordinary skilled persons in the fields from the description below.

Means to Achieve Tasks

In order to achieve the above-described technical tasks, the speech synthesis method based on brain waves during imagined speech according to an embodiment of the present invention can include the following steps: a step to obtain the user's brain waves during imagined speech; a step to convert the above-mentioned brain waves of imagined speech into embedding vectors; a step to generate the mel-spectrograms based on the above-mentioned embedding vectors; a step to generate the voice using the above-mentioned mel-spectrograms; a step to output the above-mentioned voice.

According to an embodiment, the method may further include a step make the generator and the discriminator learn, wherein the generator generates the mel-spectrogram using the embedding vectors, and the discriminator distinguishes between the mel-spectrogram generated from brain waves and the mel-spectrogram generated from voice.

According to an embodiment, the above-mentioned step to make the generator and the discriminator learn may be composed of the following steps: a step to make the generator and the discriminator learn based on the brain waves and the voice signals generated during speech; a step to perform the transfer learning for the generator and the discriminator that have learned based on the brain waves and the voice signals generated during speech; a step to make the generator and the discriminator re-learn based on brain waves generated during imagined speech.

According to an embodiment, the step to make the generator and the discriminator learn based on the brain waves and the voice signals generated during speech may include following substeps: a substep to acquire the brain waves and the voice signals generated during speech; a substep to convert the brain waves generated during above-mentioned speech into the embedding vectors; a substep to generate the mel-spectrogram based on the embedding vectors converted from the brain waves generated during imagined speech; a substep to make the above-mentioned generator and discriminator learn through the mel-spectrogram based on the embedding vectors converted from the brain waves generated during speech and through the mel-spectrogram from the voice signals.

According to an embodiment, the step to convert the user's imagined speech brain waves into the embedding vectors may be the step to convert the above-mentioned brain waves into the embedding space that maximizes the difference of the imagined speech brain waves between the phonemes or words.

According to an embodiment, the method may further include a step to convert the above-mentioned voices into letters, phonemes, or pronunciations based on a voice recognition model.

According to an embodiment, the converted letters, phonemes, or pronunciations may be used for learning of the generator.

Meanwhile, according to an embodiment of the present invention in order to achieve the above-mentioned technical tasks, the brainwave-based speech synthesis apparatus during imagined speech may include the following units: a brain wave and voice signal recognition unit that obtains the user's brain waves during imagined speech; a feature vector conversion unit that converts the obtained imagined speech brain waves into the embedding vectors; a voice synthesis unit that generates the mel-spectrograms based on the embedding vectors and then generates the voice using the above-mentioned mel-spectrograms; a voice output unit that outputs the generated voice.

According to an embodiment, the voice synthesis unit may include a mel-spectrogram generation subunit with a generator to generate the mel-spectograms using the embedding vectors and a discrimination subunit with a discriminator to distinguish between the mel-spectrograms generated from brain waves and the mel-spectrograms generated from voice.

According to an embodiment, the generator and the discriminator may learn based on the brain waves and the voice signals generated during speech; the transfer learning is performed on the above-mentioned generator and discriminator that have learned based on brain waves and voice signals generated during speech; the above-mentioned generator and discriminator can re-learn based on brain waves generated during imagined speech.

According to an embodiment, the learning of the generator and the discriminator based on the brain waves and voice signals generated during speech may include the following procedures: the acquisition of the brain waves and voice signals generated during above-mentioned speech; the conversion of the above-mentioned brain waves generated during speech into the embedding vectors; the generation of the mel-spectrogram based on the above-mentioned embedding vector converted from the brain wave generated during the speech; the learning of the generator and the discriminator through the above-mentioned mel-spectrogram based on the embedding vector converted from the brain wave generated during the speech and the mel-spectrogram of the above-mentioned voice signals.

According to an embodiment, the feature vector conversion unit may convert the user's imagined speech brain waves into the embedding space that maximizes the differences between phonemes or words of the imagined speech brain waves.

According to an embodiment, the above-mentioned voice synthesis unit may include the letter recognition sub-unit that converts the voice into letters, phonemes, or pronunciations based on a voice recognition model.

According to an embodiment, the above-mentioned converted letters, phonemes, or pronunciations may be used for learning of the generator.

Effects of Invention

According to various embodiments of the present invention, it enables the communication with a high degree of freedom by synthesizing the user's voice with a high degree of freedom from brain waves through a generation model and a methodology of voice recognition.

The effects of the present invention are not limited to those mentioned above, and other effects not mentioned will be clearly understood by those skilled in the field from the description below.

BRIEF DESCRIPTION OF DRAWINGS

FIG. 1 is a diagram showing the learning process of a method for synthesizing the voice based on brain waves during imagined speech according to an embodiment of the present invention.

FIG. 2 shows the usage of a method for synthesizing the voice based on brain waves during imagined speech according to an embodiment of the present invention.

FIG. 3 shows the configuration of an apparatus for synthesizing the voice based on brain waves during imagined speech according to an embodiment of the present invention.

FIG. 4 shows the specific structure of a voice synthesis unit according to an embodiment of the present invention.

FIG. 5 shows the specific operation of an apparatus for synthesizing the voice based on brain waves during imagined speech according to an embodiment of the present invention.

SPECIFIC CONTENT FOR IMPLEMENTING THE INVENTION

Detailed objects, technical configurations and operational effects of the present invention will be more clearly understood by the following descriptions based on the accompanying drawings in the specification of the present invention. The embodiments according to the present invention will be described in detail with reference to the accompanying drawings.

The embodiments disclosed in this specification should not be construed or used as limiting the scope of the present invention. For those skilled in the field, it is natural that the descriptions including the embodiments herein have a variety of applications. Therefore, any embodiments in the detailed descriptions of the present invention are illustrative for better explaining the present invention and are not intended to limit the scope of the present invention to the embodiments.

The function blocks shown in the drawings and described below are just examples of possible implementations. Other function blocks may be used in other implementations without deviating from the spirit and scope of the detailed descriptions. And while one or more function blocks of the present invention are represented as separate blocks, the function blocks may be a combination of various hardware and software configurations that perform the same functions.

In addition, the phrase of "including certain components" is simply an expression of "open type" indicating that the corresponding components are existing, and should not be understood as excluding additional components.

Furthermore, the phrase that a component is "connected to" or "contacted with" another component should be understood that it may be directly connected to or contacted with another component, but other components may exist in the middle between them.

In the following drawings, a method and apparatus for synthesizing the voice based on brain waves during imagined speech according to various embodiments of the present invention will be described in detail with reference to the drawings. Each step of the brainwave-based speech synthesis method during imagined speech according to various embodiments of the present invention, which will be described with reference to the following drawings, is performed by the brainwave-based speech synthesizing apparatus during imagined speech. In addition, in the following descriptions of the present invention, unless otherwise defined, the "apparatus" may be understood to mean a brainwave-based speech synthesizing apparatus during imagined speech according to various embodiments of the present invention.

Technologies for recognizing the user's intention from brain waves have recently been developed, and deep learning-based methodologies are also being developed to improve the classification recognition performance. Among them, the user intention recognition technology based on the imagined speech has an advantage in that it can increase the number of classes. However, the classification-based user intention recognition has the problem in that the degree of freedom is limited to the number of classification classes. Therefore, the present invention proposes a speech synthesis method for synthesizing the speech from brain waves.

The voice during actual speech may have different brain waves from those during imagined speech. On the other hand, the brain waves generated during actual speech occur temporally identical to the voice during speech, and have the similar activity features to the brain waves generated during imagined speech. Therefore, the brain waves during actual speech can function as a medium connecting between the brain waves generated during imagined speech and the voice during speech.

Therefore, the present invention proposes a method to use the brain waves and the voice signals generated during actual speech for learning while compensating the difference between brain waves during imagined speech and those during actual speech. After obtaining the brain waves and the voice signals during actual speech, the generator and the discriminator are trained based on the brain waves during speech using the voice signals during speech as the ground truth (correct answer). Then, the generator and the discriminator are re-trained based on the learning result through the fine-tuning technique at a low learning rate using the brain waves during imagined speech. It will be described in detail with reference to FIG. 1 below.

FIG. 1 is a diagram showing the learning process of a method for synthesizing the voice based on brain waves during imagined speech according to an embodiment of the present invention Referring to FIG. 1, the apparatus may obtain the user's brain waves generated while the user speaks (S110). Here, the speech brain waves may be obtained while repeating the states of resting, providing auditory or visual cues, and making imagined speech. As an example, the apparatus measures the user's brain waves in a resting state for 2 seconds and then the user is provided with information about a class in which speech is to be performed using an auditory or visual cue for 2 seconds. And, for next 2 seconds, the user actually speaks for a given class, during which the apparatus acquires the uttered voice signals along with the brain waves of the user who actually speaks. The apparatus can obtain the user's speech brain waves and voice signals while repeating the states of resting, providing auditory or visual cues, and making imagined speech n times. The speech brain waves are measured by arranging the channels to include the Broca-Wernicke region where the brain waves are characteristically expressed, and the brain waves are collected at a sampling frequency of 1000 Hz. However, it should be noted that this is only a preferred example for explaining and does not limit the scope of the present invention. The channel location or sampling frequency may vary depending on circumstances. Noises included in brain waves can be removed through the preprocessing process. The brain wave features generated when a user speaks can be extracted using time-frequency features.

The apparatus can generate the embedding vectors through the embedding conversion process of the common spatial pattern (CSP) or the log variance in order to maximize the division of each phoneme or word for the acquired brain waves during speech (S120). Such embedding vector conversion process can maximize the difference between phonemes or words of imagined speech. In addition, by sharing the embedding transformation matrix of the brain waves during speech and the brain waves during imagined speech, it can facilitate the transfer learning, which will be described later.

The apparatus can train the generator and the discriminator for generating the mel-spectrogram (S130). Here, the generator creates the mel-spectrogram based on the embedding vectors. A generator may consist of several convolution layers, residual blocks, or attention modules. For the learning of a generator that generates such mel-spectrograms, the apparatus may train the generator using the mel-spectrograms of the user's or other's voice signals as the ground truth (correct answer). That is, the generator can be trained to generate the brain wave-based mel-spectrograms similar to those of the speech given as ground-truth. In addition, the apparatus can train a discriminator that distinguishes the mel-spectrograms generated from the brain signal and the mel-spectrograms generated based on the actual voice signals. The discriminator learns how to distinguish between the mel-spectrograms generated from brain waves and the mel-spectrograms generated based on voice signals in the adversarial learning method. Meanwhile, the generator can be trained to make the mel-spectrograms generated from brain waves and the mel-spectrograms generated based on voice signals so similar for the discriminator not to distinguish between the mel-spectrograms from the brain waves and those based on the voice signals.

The mel-spectrograms generated through the generator can generate the voice through the vocoder (S140). In addition, the generated voice signals can be converted into letters, phonemes, or pronunciations through the speech recognition model, during which a loss function can be obtained with the differences from actual letters and be reflected in the learning of the above-mentioned generator. Here, the vocoder may be a pre-learned one to generate the voice from specific mel-spectrograms, and the voice recognition model may be a pre-learned one to recognize letters, phonemes, etc. from voice. Therefore, it may not be necessary for the apparatus to separately learn the recognition model.

Up to now, it has been described how the apparatus learns based on brain waves and speech signals during actual speech. From now, it is explained how the apparatus learns using imagined speech brain waves based on the learning results from brain waves during speech.

The apparatus can obtain the user's brain waves generated during imagined speech (S150). Here, the brain waves of imagined speech may be obtained while repeating the process of resting, providing an auditory or visual cue, and making imagined speech. For example, the apparatus may measure the user's brain waves in a resting state for 2 seconds and then provide the user with information about a class to perform imagined speech with an auditory or visual cue for 2 seconds. For next 2 seconds, the user can perform imagined speech on the given class. The apparatus collects brain waves of a user performing imagined speech. The apparatus may acquire the user's imagined speech brain wave while repeating the states of resting, providing auditory or visual cues, and making imagined speech n times. The imagined speech brain waves are measured by arranging the channels to include the Broca-Wernicke region where the brain waves are characteristically expressed, and the brain waves are collected at a sampling frequency of 1000 Hz. However, it should be noted that this is only a preferred example for explaining and does not limit the scope of the present invention. The channel location or sampling frequency may vary depending on circumstances. Noises included in brain waves can be removed through the preprocessing process. The brain wave features generated when a user speaks can be extracted using time-frequency features.

The apparatus can generate the embedding vectors through the embedding conversion process of the common spatial pattern (CSP) or the log variance in order to maximize the division of each phoneme or word for the acquired brain waves during speech (S160). Such embedding vector conversion process can maximize the difference between phonemes or words of imagined speech. In addition, by sharing the embedding transformation matrix of the brain waves during speech and the brain waves during imagined speech, it can facilitate the transfer learning, which will be described later.

The apparatus can train the generator and the discriminator for generating the mel-spectrogram (S170). Here, the generator creates the mel-spectrogram based on the embedding vectors. A generator may consist of several convolution layers, residual blocks, or attention modules. According to an embodiment, in the learning process based on imagined speech brain waves, the generator and the discriminator that have learned based on the brain waves and the voice signals during actual speech described above are re-trained through the transfer learning, And, through the re-trained generator, the apparatus can generate the mel-spectrogram based on the embedding vectors generated with imagined speech brain waves. In this way, the transfer learning is first performed through the generator and the discriminator that have learned with the brain waves and the voice signals during actual speech, and then, while fine-tuning the generator and the classifier at a low learning rate using the brain waves during imagined speech, the generator can be re-trained.

The mel-spectrograms generated through the generator can generate the voice through the vocoder (S180). In addition, the generated voice signals can be converted into letters, phonemes, or pronunciations through the speech recognition model, during which a loss function can be obtained with the differences from actual letters and be used in the re-training of the generator. Here, the vocoder may be a pre-learned one to generate the voice from specific mel-spectrograms, and the voice recognition model may be a pre-learned one to recognize letters, phonemes, etc. from voice. Therefore, it may not be necessary for the apparatus to separately learn the recognition model in implementing the present invention.

FIG. 2 is a diagram showing a process of using the brainwave-based speech synthesis method for imagined speech according to an embodiment of the present invention.

The apparatus may acquire the user's brain waves generated when the user performs imagined speech (S210). Here, the imagined speech brain waves may be the ones generated during imagined speech implying the user's intention. As like in the learning process, the imagined speech brain waves can be measured by arranging the channels to include the Broca-Wernicke region where the brain waves are characteristically expressed, and the brain waves are collected at a sampling frequency of 1000 Hz. However, it should be noted that this is only a preferred example for explaining and does not limit the scope of the present invention. The channel location or sampling frequency may vary depending on circumstances. Noises included in brain waves can be removed through the preprocessing process. The brain wave features generated when a user imagines speech can be extracted using time-frequency features.

As like in the learning process, the apparatus may generate the embedding vectors based on the acquired brain waves using the embedding transformation matrix (S220).

The apparatus may generate the mel-spectrogram using the generated embedding vectors through the constructor that has learned in the learning process (S230).

The mel-spectrograms generated through the generator may generate and output the voice through the vocoder (S240). Here, the vocoder is the one pre-learned to generate a voice from specific mel-spectrograms and may preferably be the same one used in the learning process.

Up to now, with reference to FIGS. 1 and 2, the learning process and use process for implementing the brainwave-based speech synthesis method during imagined speech according to an embodiment of the present invention have been described. Hereinafter, the configuration of a brainwave-based speech synthesizing apparatus for implementing the above-described method will be described.

FIG. 3 is a diagram showing the configuration of a brainwave-based speech synthesiziing apparatus according to an embodiment of the present invention.

Referring to FIG. 3, the apparatus (300) for synthesizing brain waves during imagined speech according to an embodiment of the present invention may include a brain wave and voice signal recognition unit (310), a feature vector conversion unit (320), a voice synthesis unit (330), and a voice output unit (340).

The brain wave and voice recognition unit (310) can acquire the brain waves and the voices during actual speech and the brain waves during imagined speech. For example, in the learning process, the apparatus (300) can induce various actual and imagined speeches to analyze the user's imagined speech brain wave pattern for learning, and the brain wave and voice recognition unit (310) can obtain brain waves generated during actual speech, actual speech voice signals, and brain waves generated during imagined speech from the user. Moreover, in the use process, the brain wave and voice recognition unit (310) can obtain the imagined speech brain waves including the user's intention.

The feature vector conversion unit (320) can convert the obtained brain waves into the embedding vectors, and convert the brain waves into the embedding space that maximizes a difference between phonemes or words. In an embodiment, the feature vector conversion unit (320) may convert the brain waves into the embedding vectors based on the common spatial pattern (CSP) or the log variance.

The voice synthesis unit (330) can generate the mel-spectrograms based on the embedding vectors converted through the feature vector conversion unit (320) and generate the voice based on the generated mel-spectrograms. A detailed configuration of the voice synthesis unit (330) will be described later with reference to FIG. 4.

The voice output unit (340) can output the voice synthesized through the voice synthesis unit (330).

FIG. 4 is a diagram showing a detailed configuration of the voice synthesis unit according to an embodiment of the present invention.

Referring to FIG. 4, the voice synthesis unit (330) of the apparatus (300) according to an embodiment of the present invention may include a mel-spectrogram generation subunit (410), a discrimination subunit (420), a voice generation subunit (430), and a letter recognition subunit (440).

The mel-spectrogram generation subunit (410) includes a generator that can generate the mel-spectrograms using the embedding vectors generated by the feature vector conversion unit (320). The generator in the mel-spectrogram generation subunit (410) can learn based on the brain waves and the voice signals generated during actual speech in the learning process, and then re-learn based on the brain waves generated during imagined speech in the transfer learning.

The discrimination subunit (420) determines whether the generated mel-spectrograms are based on the brain waves or the voice signals, for which it may include a discriminator. The discriminator included in the discrimination subunit (420) can be trained to discriminate between the mel-spectrogram generated from the brain waves and the mel-spectrogram generated based on the voice signals in the adversarial learning method.

The voice generation subunit (430) generates the voice through the pre-learned vocoder using the mel-spectrogram generated by the mel-spectrogram generation subunit (410). The generated voice may be transferred to the voice output unit (340) to be output.

The letter recognition subunit (440) converts the voice generated by the voice generation subunit (430) into letters, phonemes, or pronunciations through the pre-learned voice recognition model, which can be used for re-learning of the generator in the mel-spectrogram generation subunit (410).

Meanwhile, the above-mentioned learning in the voice synthesis unit (330) may be performed in forms of letters or phonemes, and thus it may synthesize the unlearned words and sentences through combinations of learned letters or phonemes.

FIG. 5 is a diagram showing a specific operation of the brainwave-based voice synthesizer during imagined speech according to an embodiment of the present invention.

In the learning or use process, the apparatus can acquire the brain waves and the voice signals during actual speech of the user and the brain waves during imagined speech through the brainwave and voice recognition unit. Of these, the brain waves during actual speech and the brain waves during imagined speech are converted into embedding vectors through the feature vector conversion unit, and the converted embedding vectors are converted into the mel-spectrograms through the generator of the mel-spectrogram generation subunit in the speech synthesis unit. Since the learning method of the generator that converts the embedding vectors into the mel-spectrograms has already been described, a detailed description is not given here. The generated mel-spectrograms are converted to the voice in the voice generation subunit using the pre-learned vocoder, and the generated voice is output through the voice output unit.

Meanwhile, the voice signals obtained during actual speech are directly converted into mel-spectrograms, and the discriminator of the discrimination subunit learns to distinguish between the mel-spectrograms generated through the generator based on brain waves and the mel-spectrogram generated based on actual voice signals. Therefore, the generator can be trained to generate the mel-spectrograms so that the discriminator cannot distinguish between the mel-spectrograms generated based on brain waves and the mel-spectrogram generated based on voice signals.

The voice generated by the voice generation subunit is converted into letters, phonemes, or pronunciations through the pre-learned voice recognition model in the letter recognition subunit, and they can be used for learning of the generator.

Meanwhile, even if not shown in FIGS. 3~5, the apparatus may include at least one processor to control or operate a series of components included in the apparatus, a memory to load a computer program executed by the above-mentioned processor, and a storage to store the above-mentioned computer program. As an example, the processor may be any of the central processing unit (CPU), the micro processor unit (MPU), the micro controller unit (MCU), or other processor widely known in the field to which the present invention belongs. The memory may store various types of information and/or commands, and may load one or more computer programs from the storage to perform the brainwave-based user assistance method according to an embodiment of the present invention. The storage may non-temporarily store one or more computer programs and large amounts of network information. Such storage may include non-volatile memories such as read only memory (ROM), erasable programmable ROM (EPROM), electrically erasable programmable ROM (EEPROM), flash memory, hard disk (HDD), secondary storage drive (SSD), removable disk, or other computer readable recording media in any form widely known in the field to which the present invention belongs. The computer program is loaded into the memory and executed by at least one processor to perform a brainwave-based user assistance method according to an embodiment of the present invention.

Although the embodiments of the present invention have been described with reference to the accompanying drawings, the skilled persons in the field to which the present invention belongs will be able to understand that the present invention can be implemented in other specific forms without changing its technical spirit or essential features. Therefore, the embodiments described above should be understood as illustrative in all respects and not definitive.

EXPLANATION OF CODES

300: brainwave-based voice synthesis apparatus during imagined speech

310: brain wave and voice recognition unit
320: feature vector conversion unit
330: voice synthesis unit
340: voice output unit
410: mel-spectrogram generation subunit
420: discrimination subunit
430: voice generation subunit
440: letter recognition subunit

The invention claimed is:

1. A method for synthesizing a voice based on brain waves during imagined speech through an apparatus for synthesizing the voice based on brain waves during imagined speech, the method comprising the steps of:
a step to obtain user's brain waves during imagined speech;
a step to convert the obtained brain waves during imagined speech into embedding vectors;
a step to generate Mel-spectrograms based on the embedding vectors;
a step to generate the voice using the Mel-spectrograms;
a step to output the generated voice; and
a step to train a generator and a discriminator,
wherein the generator can generate the Mel-spectrograms using the embedding vectors, and the discriminator can distinguish between the Mel-spectrograms generated from brain waves and the Mel-spectrograms generated from voice, and
wherein the step to train the generator and the discriminator comprises the steps of:
a step to make the generator and the discriminator learn based on the brain waves and voice signals generated during speech;
a step to perform a transfer learning for the generator and the discriminator that have learned based on the brain waves and the voice signals generated during speech; and
a step to make the generator and the discriminator re-learn based on brain waves generated during imagined speech.

2. The method according to claim 1, wherein the step to make the generator and the discriminator learn based on the brain waves and the voice signals generated during speech comprises the steps of:
a substep to obtain brain waves and voice signals generated during the speech;
a substep to convert brain waves generated during the speech into embedding vectors;
a substep to generate the Mel-spectrograms based on the embedding vectors converted from brain waves during the speech; and
a substep to train the generator and the discriminator based on the Mel-spectrograms of voice signals and the Mel-spectrograms based on the embedding vectors converted from the brain waves generated during the speech.

3. The method according to claim 1,
wherein the step to convert user's brain waves obtained during imagined speech into the embedding vectors is to convert user's imagined speech brain waves into an embedding space that maximizes the difference between phonemes or words of the imagined speech brain wave.

4. The method according to claim 1, further comprising:
a step to convert the voice into letters, phonemes, or pronunciation based on a voice recognition model.

5. The method according to claim 4,
wherein the converted letters, phonemes, or pronunciations are used for learning of the generator.

6. An apparatus for synthesizing a voice based on brain waves during imagined speech, the apparatus comprising a processor-based brain wave and voice signal recognition module configured to obtain the user's brain waves during imagined speech; a processor-based feature vector conversion module including an embedding transformer that converts the obtained imagined speech brain waves into embedding vectors; a processor-based voice synthesis module including a Mel-spectrogram generator and a vocoder, the voice synthesis module being configured to generate Mel-spectrograms based on the embedding vectors and generates the voice using the Mel-spectrograms; and a voice output module including a speaker or audio interface configured to output the generated voice, wherein the voice synthesis module comprises: a Mel-spectrogram generation component including a neural network generator comprising convolutional layers, residual blocks, or attention modules configured to generate the Mel-spectrograms from the embedding vectors; and a discrimination component including a neural network discriminator trained to distinguish between the Mel-spectrograms generated from brain waves and the Mel-spectrograms generated from voice signals, wherein the Mel-spectrogram generation component and the discrimination component are processor-implemented neural networks trained based on brain waves and voice signals generated during speech, wherein for the Mel-spectrogram generation component and the discrimination component that have been trained based on brain waves and voice signals generated during speech, a transfer learning process is performed by fine-tuning the neural networks, and wherein the Mel-spectrogram generation component and the discrimination component are retrained based on the brain waves generated during imagined speech.

7. The apparatus according to claim 6,
wherein the processor-based Mel-spectrogram generation component and discrimination component are configured to:
obtain the brain waves and voice signals generated during speech,
convert the brain waves generated during speech into embedding vectors using the embedding transformation processor,
generate the Mel-spectrograms based on the embedding vectors converted from the brain waves during speech, and
train the Mel-spectrogram generation component and discrimination component based on Mel-spectrograms derived from the embedding vectors converted from brain waves during speech and on Mel-spectrograms of the voice signals.

8. The apparatus according to claim 6,
wherein the feature vector conversion module includes an embedding transformation processor configured to convert the user's brain waves obtained during imagined speech into an embedding space that maximizes the difference between phonemes or words of the imagined speech brain waves.

9. The apparatus according to claim 6,
wherein the voice synthesis module further comprises:
a letter recognition component including a pre-trained speech recognition model implemented in software or firmware and configured to convert the generated voice into letters, phonemes, or pronunciations.

10. The apparatus according to claim 9,
wherein the converted letters, phonemes, or pronunciations produced by the letter recognition component including the pre-trained speech recognition model are used for learning and updating parameters of the Mel-spectrogram generation component.

\* \* \* \* \*